(No Model.)

W. H. FERGUSON.
BUTTER CRATE.

No. 423,144. Patented Mar. 11, 1890.

WITNESSES:

INVENTOR:
W. H. Ferguson
BY Munn & Co.
ATTORNEYS.

UNITED STATES PATENT OFFICE.

WILLIAM H. FERGUSON, OF SEATTLE, WASHINGTON.

BUTTER-CRATE.

SPECIFICATION forming part of Letters Patent No. 423,144, dated March 11, 1890.

Application filed April 26, 1889. Serial No. 308,698. (No model.)

*To all whom it may concern:*

Be it known that I, WILLIAM H. FERGUSON, of Seattle, in the county of King and Territory of Washington, have invented a new and useful Improvement in Butter-Crates, of which the following is a full, clear, and exact description.

My invention relates to an improvement in butter-crates or equivalent receptacles adapted for the transportation of butter, and has for its object to provide a crate in which a maximum number of butter pats may be packed together with a minimum quantity of brine.

The invention consists in the novel construction and combination of the several parts, as will be hereinafter fully set forth, and pointed out in the claim.

Reference is to be had to the accompanying drawings, forming a part of this specification, in which similar figures of reference indicate corresponding parts in both of the views.

Figure 1:
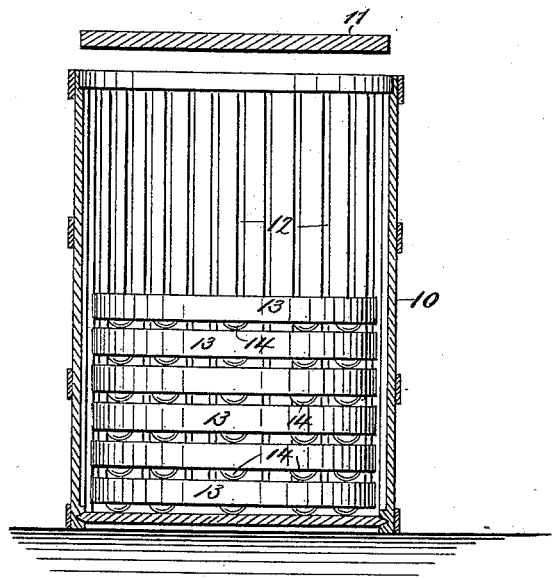
Figure 2:
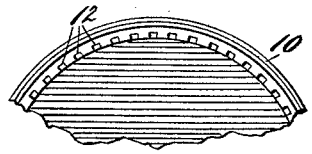

Figure 1 is a central vertical section through the crate, the butter pats being in side elevation and the cover of the crate raised. Fig. 2 is a partial plan view of the crate with the top removed.

The crate 10 is preferably made cylindrical and provided with closed sides and bottom, and a top 11, adapted when placed in position to effectually exclude air from the interior of the crate. To that end the upper interior surface of the crate-body is provided with an annular recess, into which the top closely fits, being held in position in any approved manner, and in the inner surface of the crate or receptacle 10 a series of longitudinal grooves 12 are produced, extending from or above the bottom to the annular recess, as best illustrated in Fig. 1. When the top is in place, it closes the upper end of the said grooves and a liquid-tight crate is formed.

In practice it is found that the best results are obtained when the butter pats 13 are provided upon one or upon both faces with a series of teats or projections 14.

In operation the pats of butter are placed one upon the other within the interior of the crate, the teats or projections of the lower pats resting upon the bottom of the crate, the said pats being preferably introduced in such quantities that they will essentially fill the crate. When the pats have been introduced into the crate, the brine or other preserving-liquid is poured upon the pats, and by reason of the grooves 12 in the crate the liquid is enabled to find its way downward beneath the lower pat and between the contiguous faces of the various pats above it.

I desire it to be understood that I do not confine myself to the cylindrical contour of the vessel or crate illustrated, or to the particular cross-section of the grooves shown.

Having thus described my invention, I claim as new and desire to secure by Letters Patent—

A butter-crate having closed sides and bottom and provided with an annular recess in the interior surface near the top, and with a series of grooves in the interior surface extending from or above the bottom to the annular recess, and a top adapted to enter said recess and close the series of grooves, thereby forming a liquid-tight crate, as described.

WILLIAM H. FERGUSON.

Witnesses:
A. E. NORDLINGER,
H. R. CHALLENOR.